US 6,455,208 B1

(12) United States Patent
Yamashiki et al.

(10) Patent No.: US 6,455,208 B1
(45) Date of Patent: Sep. 24, 2002

(54) COLOR FILTER AND LIQUID CRYSTAL DISPLAY

(75) Inventors: Yuka Yamashiki; Masuichi Eguchi; Takuo Watanabe; Jun Tsukamoto, all of Shiga (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/559,399

(22) Filed: Apr. 26, 2000

Related U.S. Application Data

(63) Continuation of application No. PCT/JP99/04650, filed on Aug. 27, 1999.

(30) Foreign Application Priority Data

Aug. 19, 1998 (JP) ............................................ 10-242903
Dec. 22, 1998 (JP) ............................................ 10-365620

(51) Int. Cl.⁷ .......................... G02B 5/20; G02F 1/1335
(52) U.S. Cl. ............................ 430/7; 349/106; 359/891
(58) Field of Search ............................ 430/7; 349/106; 359/891

(56) References Cited

U.S. PATENT DOCUMENTS 5,721,076 A * 2/1998 Watanabe et al. ............... 430/7

FOREIGN PATENT DOCUMENTS

| JP | 3-168702 A | * | 7/1991 |
| JP | 7-098409 A | * | 4/1995 |
| JP | 8-278630 A | * | 10/1996 |
| JP | 4-164901 A | * | 11/1997 |
| JP | 11-104824 A | * | 1/1999 |

* cited by examiner

Primary Examiner—John A. McPherson

(57) ABSTRACT

An object of the present invention is to provide a liquid crystal display exhibiting excellent display performance. The object of the present invention is achieved by a colored polymer thin film having an average refractive index of 1.60 to 1.90, and an absolute value of birefringence of 0.01 or less, and a color filter and a liquid crystal display using the colored polymer thin film. The color filter using the colored polymer thin film of the present invention exhibits reduced retardation, and can thus provide a liquid crystal display exhibiting excellent display performance.

11 Claims, No Drawings

COLOR FILTER AND LIQUID CRYSTAL DISPLAY

This application is a continuation of PCT/JP99/04650 filed Sep. 14, 1999.

TECHNICAL FIELD

The present invention relates to a colored polymer thin film, a color filter, and a liquid crystal display.

1. Background Art

From the viewpoint of ease of thin film processing, and low cost, polymer thin films are used in a wide range of fields of optical part applications such as an optical waveguide, a matrix material for a color filter, and the like, electronics applications such as an interlayer insulator layer in LSI, a passivation layer, a buffer coat, and the like.

However, such polymer thin films generally have high birefringence, and thus cause a phase difference in transmitted light due to high retardation when used for a color filter, thereby increasing the viewing angle characteristic and deteriorating display performance of a liquid crystal display.

2. Disclosure of Invention

The present invention has been conceived in consideration of the above-described drawbacks of conventional techniques, and an object of the invention is to provide a liquid crystal display exhibiting excellent display performance.

The object of the present invention is achieved by a colored polymer thin film having an average refractive index of 1.60 to 1.90, and an absolute value of birefringence of 0.01 or less, and a color filer and a liquid crystal display using the polymer thin film.

BEST MODE FOR CARRYING OUT THE INVENTION

A colored polymer thin film of the present invention represents a thin film colored with a pigment, a dye, or the like, composed of a polymer such as an acrylic resin, an alkyd resin, polyester, polyimide, polyamidoimide, polyamide, or the like, and having a thickness of 0.1 to 500 $\mu$m. As a colorant, a pigment is,preferably used from the viewpoint of heat resistance.

In the present invention, optical characteristic values are defined as follows:

$n_{xy}$: Refractive index when the vibration direction of light is parallel to the film plane of a thin film;

$n_z$: Refractive index when the vibration direction of light is perpendicular to the film plane of a thin film;

d: Thickness of a thin film

Average refractive index (avg)=$(2n_{xy}+n_z)/3$ Birefringence $\Delta n=n_{xy}-n_z$ Retardation: Product of birefringence and film thickness ($\Delta n \times d$)

As these optical characteristic values, measurements of the colored polymer thin film at the peak wavelength of transmitted light were used. For example, light at a wavelength 610 nm is used for a red colored thin film, a wavelength 540 nm, a green colored thin film; a wavelength of 430 nm, a blue colored thin film.

As a result of various researches of the method of improving the display performance of a liquid crystal display, the inventors found that a color filter using a colored polymer thin film having an average refractive index in a specified range, and birefringence in a specified range is preferably used.

The viewing-angle characteristic of the liquid crystal. display is affected by the retardation of the color filter. Although a conventional liquid crystal display having a narrow viewing angle has substantially no problem, a liquid crystal display adapted for widening the viewing angle, for example, a viewing-angle widening film-system liquid crystal. display, or a transverse electric field driving-system (IPS system) liquid crystal display, requires a color filter having low retardation. In the liquid crystal display, in order to obtain excellent display performance that a transverse deviation in the viewing angle with contrast is 5° or less in terms of a simulation value, the retardation of the colored polymer thin film is preferably 25 nm or less. The retardation is more preferably, 15 nm or lees, more preferably 10 nm or less, more preferably 5 nm or less, most preferably 3 nm or less. Since the retardation is represented by the product of a birefringence and a film thickness, the retardation can be decreased by decreasing the thickness of the colored polymer thin film. However, the colored polymer thin film of a color filter for a liquid crystal display generally has a thickness of 1.0 to 2.0 $\mu$m, and it is difficult to further decreasing the thickness. Therefore, in order to decrease the retardation of the color filter, it is necessary to decrease the birefringence of the colored polymer thin film.

Namely, the colored polymer thin film of the present invention has an average refractive index of as high as 1.60 to 1.90, and an absolute value of birefringence of 0.01 or less, more preferably 0.005 or lees, more preferably 0.0025 or less, most preferably 0.001 or less. Particularly, a green colored thin film used for green pixels of the color filter has highest luminous transmittance and highest influence on the viewing-angle characteristic of the liquid crystal display, and thus the absolute value of birefringence is preferably as low as possible.

As a result of intensive research of the method of obtaining a colored polymer thin film having a high refractive index and low birefringence, it was found that the following two methods are effective. A first method is to contain a polymer having plane structural groups in side chains in the colored polymer thin film. This can suppress planar orientation of the colored polymer thin film, and attain a low birefringence without deteriorating other characteristics. A second method is to contain particles for reducing birefringence having a birefringence with a sign opposite to a polymer in the colored polymer thin film. This can compensate for the birefringence of the polymer, and decrease the birefringence without deteriorating other characteristics.

The first method is first described. The side chains of a polymer mean portions branching from the main chain direction of the polymer. The plane structural groups mean groups having at lest one aromatic ring. Examples of such plane structural groups include monocyclic groups such as a phenyl group, a tolyl group, a xylyl group, a cumenyl group, a mesityl group, a benzyl group, a phenethyl group, a styryl group, a cinnamyl group, and the like; polycyclic groups such as a naphthyl group, an anthryl group, a phenanthryl group, an indene group, an azurene group, a fluorene group,. and the like; heterocyclic groups such as a furyl group, a pyridyl group, and the like, all of which are described in "Nomenclature of Organic Compounds (New enlarged edition)" p61–63, p80–82 (by Ryo Shunei, Sankyo Shuppan). These groups may have a substituent such as a hydrocarbon group, a halogen, or the like. The molecular weight of the plane structural group is preferably in the range of 76 to 2000, more preferably in the range of 100 to 1000, because an excessively low molecular weight decreases the effect of suppressing orientation, while an excessively high molecular weight decreases the reactivity in polymer synthesis. As the plane structural group, fluorene groups are. particularly preferred from the viewpoint of a balance between the orientation suppressing effect and. polymer reactivity.

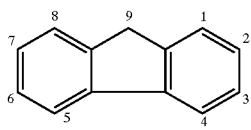

Fluorene groups are groups having a fluorene skeleton, and, of course, include groups having a hydrocarbon group, a halogen, or the like. Of monovalent fluorene groups to be bonded at any of the positions 1 to 9. and divalent fluorene groups to be bonded at the position 9, a monovalent or bivalent fluorene group, particularly a bivalent group, to be bonded at the position 9 is preferred from the viewpoint of the orientation suppressing effect.

Examples of polymer materials for forming the colored polymer thin film include acrylic resins, alkyd resins, polyester, polyimide, polyamidoimide, polyamide, and the like. However, from the viewpoint of heat resistance and refractive index, polyimide is preferred. Polyimide has high heat resistance and a high refractive index, and for example, in use as a color filter matrix material, a metal oxide film of ITO or the like can easily be formed on a polyimide thin film by sputtering and burning. In addition, since the refractive index of the polyimide thin film is close to that of ITO, an interface reflectance can be decreased.

Polyimide is generally obtained by heating or chemically treating a polyimide precursor to form an imide ring. As the polyimide precursor, a polyamic acid and ester compounds thereof are generally used. A polyamic acid is a polymer having a weight average molecular weight of 2000 or more, represented by the following formula (1):

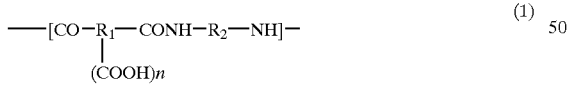

(1)

wherein $R_1$ is a tetravalent organic group having 2 to 22 carbon atoms, $R_2$ is a bivalent organic group having 1 to 22 carbon atoms, and n is 1 or 2.

The polyamic acid can be generally obtained by reacting a tetracarboxylic dianhydride and a diamine. In order to obtain the polymer having plane structural groups in the side chains, a tetracarboxylic dianhydride having a plane structural group in the side chain and/or a diamine having a plane structural group in the side chain is used. Particularly, it is preferable to use a tetracarboxylic dianhydride having a fluorene group in the side chain and/or a diamine having a fluorene group in the side chain. Particularly, a diamine having a fluorene group in the side chain is more preferably.

Typical examples of the tetracarboxylic dianhydride having a fluorene group in the side chain include the following:

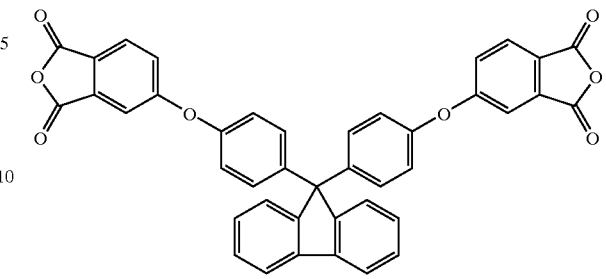

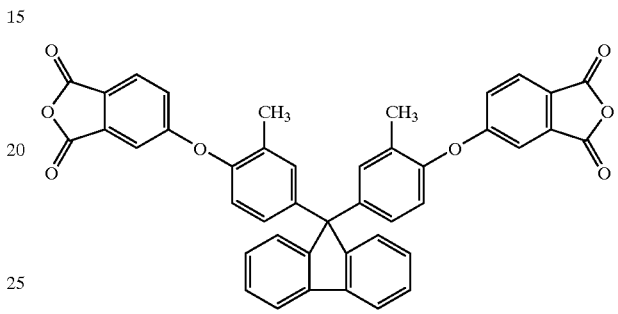

Typical examples of the diamine having a fluorene group in the side chain include the following:

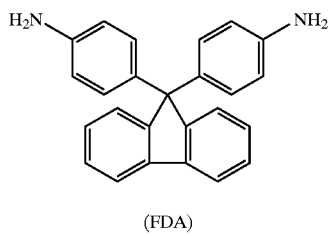

(FDA)

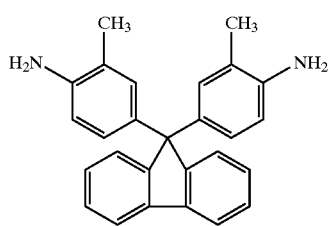

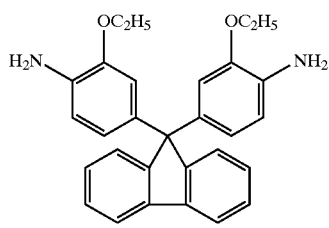

Examples of tetracarboxylic dianhydrides or diamines each having a plane structural group other than a fluorene group in the side chain include the following:

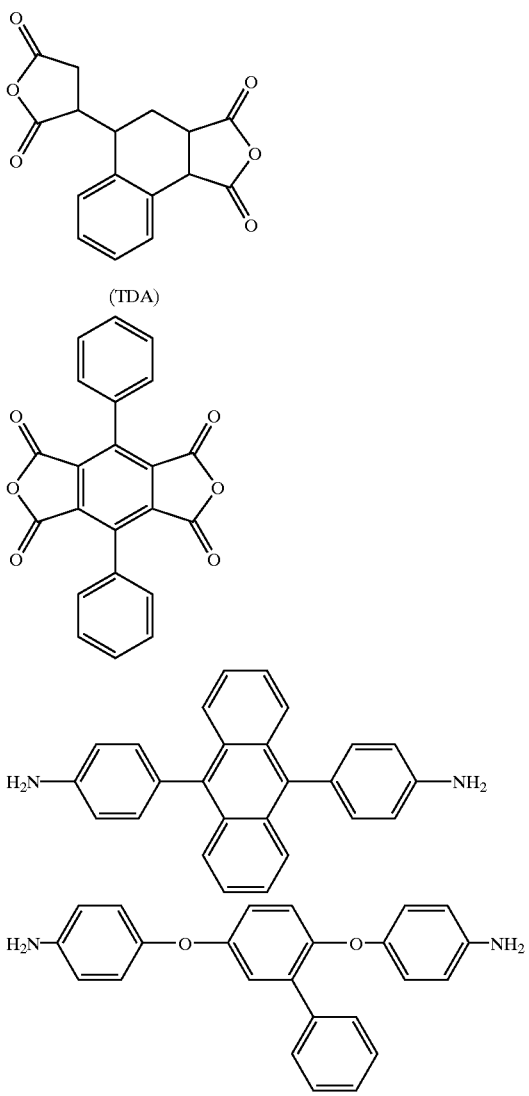

(TDA)

In the present invention, only a tetracarboxylic dianhydride and/or diamine having a plane structural group in the side chain may be used, but it may be combined with another tetracarboxylic dianhydride and/or diamine. In this case, from the viewpoint of orientation suppression, a tetracarboxylic dianhydride and/or diamine having a plane structural group in the side chain is preferably used in an amount of 20 mol % or more, more preferably 50% or more, of the total of the tetracarboxylic acid dianhydride and diamine.

Examples of other tetracarboxylic dianhydrides include aliphatic or alicyclic tetracarboxylic dianhydrides such as 1,2,3,4-cyclobutane tetracarboxylic dianhydride, 1,2,3,4-cyclopentane tetracarboxylic dianhydride, 1,2,3,5-cyclopentane tetracarboxylic dianhydride, 1,2,4,5-cyclohexene tetracarboxylic dianhydride, 1,2,3,5-cyclohexane tetracarboxylic dianhydride, 1,3,3a,4,5,9b-hexahydro-5-(tetrahydro-2,9-dioxo-3-furanyl)-naphtho[1,2-C]furan-1,3-dione, and the like. By using an aromatic tetracarboxylic dianhydride, a polyimide precursor composition can be obtained, which can be converted to a polyimide having good heat resistance. Examples of such dianhydrides include 3,3',4,4'-benzophenone tetracarboxylic dianhydride (BTDA), a pyromellitic dianhydride (PMDA), 3,4,9,10-perylene tetracarboxylic dianhydride, 3,3',4,4'-diphenylsulfone tetracarboxylic dianhydride (DSDA), 4,4'-oxydiphthalic dianhydride (OPDA), 3,3',4,4'-biphenyltetracarboxylic dianhydride (BPDA), 1,2,5,6-naphthalene tetracarboxylic dianhydride, 3,3',4,4'-para-terphenyltetracarboxylic dianhydride, 3,3',4,4'-meta-terphenyltetracarboxylic dianhydride, and the like. By using a fluorine-type tetracarboxylic dianhydride, a polyimide precursor composition can be obtained, which can be converted to a polyimide having good transparency in the short wavelength region. Examples of such dianhydrides include 4,4'-(hexafluoroisopropylidene)diphthalic dianhydride, and the like. Particularly, from the viewpoint of polarizabllity anisotropy, 3,3',4,4'-benzophenone tetracarboxylic dianhydride (BTDA), 3,3',4,4'-diphenylsulfone tetracarboxylic dianhydride (DSDA), and 4,4'-oxydiphthalic dianhydride (OPDA) are preferred. In reaction with a diamine having a fluorene group in the side chain, particularly, 4,4'-oxydiphthalic dianhydride (OPDA) is preferably used from the viewpoint of transparency, and, the content is preferably 50 ml % or more of the total of tetracarboxylic dianhydride.

As another diamine, for example, an aliphatic or alicyclic diamine can be used. Examples of such diamines include ethylenediamine, 1,3-diaminocyclohexane, 1,4-diaminocyclohexane, 4,4'-diamino- 3,3'-dimethyldicylcohexylmethane, 3,9-bis(3-aminopropyl)-2,3,8,10-tetraoxaspiro[5,5]undecane (ATU), 1,4-butanediol-bis-3-aminopropyl ether (BDDA), and the like. Particularly, ATU and BDDA are preferred from the viewpoint of polarizability anisotropy. By using an aromatic diamine, a polyimide precursor composition can be obtained, which can be converted to a polyimide having good heat resistance. Examples of such diamines include 4,4'-diaminodiphenyl ether (DAE), 3,4'-diaminodiphenyl ether, 4,4'-diaminodiphenylmethane, 3,3'-diaminodiphenylmethane, 4,4'-diaminodiphenylsulfone, 3,3'-diaminodiphenylsulfone (DDS), 4,4'-diaminodiphenylsulfine, m-phenylenediamine, p-phenylenediamine (PDA), 2,4-diaminotoluene, 2,5-diaminotoluene, 2,6-diaminotoluene, benzidine, 3,3'-dimethylbenzidine, 3,3'-dimethoxybenzidine, p-tolidine, 4,4''-diaminoterphenyl, 1,5-diaminonaphthalene, 3,3'-dimethyl-4,4''-diaminodiphenylmethane, 4,4'-bis(4-aminophenoxy)biphenyl, 2,2-bis[4-(4-aminophenoxy)phenyl]propane, bis[4-(4-aminophenoxy)phenyl]ether, bis[4-(4-aminophenoxy)phenyl]sulfone, bis[4(3-aminophenoxy)phenyl]sulfone, 4,4'-diaminobenzanilide (DABA), and the like. By using a fluorine-type diamine, a polyimide precursor composition can be obtained, which can be converted to a polyimide having good transparency in the short wavelength region. Examples of such diamines include 2,2-bis[4-(4-aminophenoxy)phenyl]hexafluoropropane, 2,6'-trifluoromethyl-4,4'-diaminobenzidine (TFDB), and the like. By using a siloxanediamine such as bis-3-(aminopropyl)tetramethylsiloxane (SiDA), adhesion to an inorganic substrate can be improved. The siloxanediamine is generally used in an amount of 1 to 20 mol % of the total of diamine. With an excessively small amount of siloxanediamine, the effect of improving adhesion is not exhibited, while with an excessively large amount of siloxanediamine, heat resistance deteriorates.

Synthesis of polyamic acid is generally effected by reacting a tetracarboxylic dianhydride and diamine in a polar organic solvent. In this reaction, the degree of polymerization of polyamic acid can be controlled by controlling the mixing ratio of the tetracarboxylic dianhydride to the diamine. This is true for ester compounds of the polyamic acid. As the solvent, amide-type polar solvents such as N-methyl-2-pyrrolidone, N,N-dimethylacetamide, N,N- dimethylformamide, and the like can be used. Besides these solvents, solvents composed of lactone as a main component or lactone only are also preferred for improving the dispersion effect of a pigment used as a colorant. The solvents composed of lactone as a main component or lactone only mean solvents containing 50% by weight of lactone. Lactones mean alicyclic ester compounds having 3 to 12 carbon atoms. Examples of such lactones include β-propyrolactone, γ-butyrolactone, γ-valerolactone, δ-valerolactone, γ-caprolactone, ε-caprolactone, and the like. Particularly, γ-butyrolactone is preferred from the viewpoint of the solubility of polyamic acid. Examples of solvents other than the lactone solvents include the above-described amide polar solvents, methyl cellosolve, ethyl cellosolve, methyl carbitol, etyl carbitol, 3-methoxy-3-methylbutanol, and the like.

Similarly, in polymer materials other than polyimide, for example, acrylic resins, alkyd resins, polyester, polyamidoimide, and polyamide, the plane structural group can be introduced into the side chains of a polymer by polymerization reaction using a monomer having a plane structural group in the side chain. Examples of reactive groups related to polymerization of the monomer include an amino group, a hydroxyl group, an epoxy group, an acrylic group, and the like. Typical examples of the monomer include 9,9-bis(hydroxyphenyl)-fluorene, bisphenoxyethanolfluorene, biscresolfluorene diglycidyl ether, bisphenoxyethanolfluorene diglycidyl ether, bisphenoxyethanolfluorene diacrylate (BPEFA), and the like.

With respect to the amount of the monomer having a plane structural group used for the side groups, an excessively small amount of monomer produces no effect of suppressing orientation, and an excessively large amount of monomer deteriorates solvent resistance. Therefore, the amount of the monomer used is preferably 1 to 30% by weight, more preferably 2 to 25% by weight, most preferably 3 to 20% by weight, of the total solid content of the colored polymer thin film.

The second method is next described. In the present invention, the particles for reducing birefringence have orientation, and the property that the direction of polarization anisotropy is different from the direction of polarization anisotropy of the polymer, preferably perpendicular to that of the polymer. The particles for reducing birefringence of the present invention preferably have a flake shape or needle-like shape.

The particles for reducing birefringence preferably have a plane structural group, more preferably have at least two plane structural groups. With at least two plane structural groups, a conformation causes the particles to have two components of polarization anisotropy, in which the plane of at least one of these groups is substantially perpendicular to the planes of the other plane structural groups. As a result, the direction of one polarization anisotropy is the same as the direction of the polarization anisotropy of the polymer, and the direction of the other polarization anisotropy is perpendicular to the direction of polarization anisotropy of the polymer, decreasing the birefringence of the colored polymer thin film.

As the plane structural group, the same as the above-described groups can be used, but fluorene groups and quinolyl groups are preferred from the viewpoint of the effect of suppressing orientation.

As the fluorene groups, the same as the above-described groups can be used. Examples of molecules which constitute the particles having a fluorene group and two components of polarization anisotropy include the following:

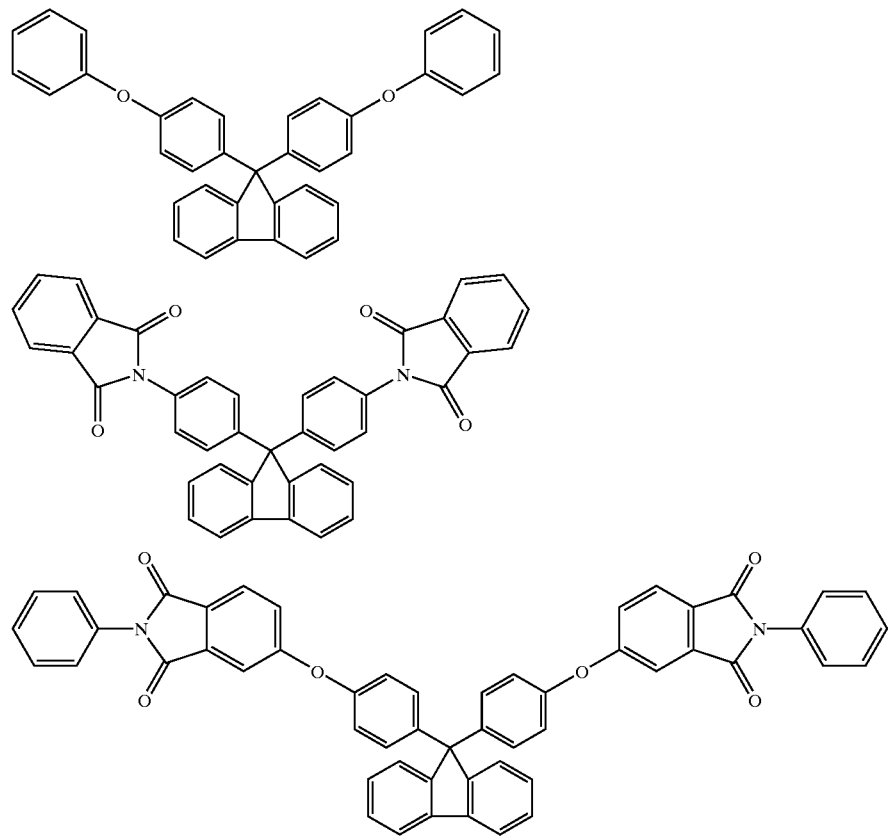

-continued

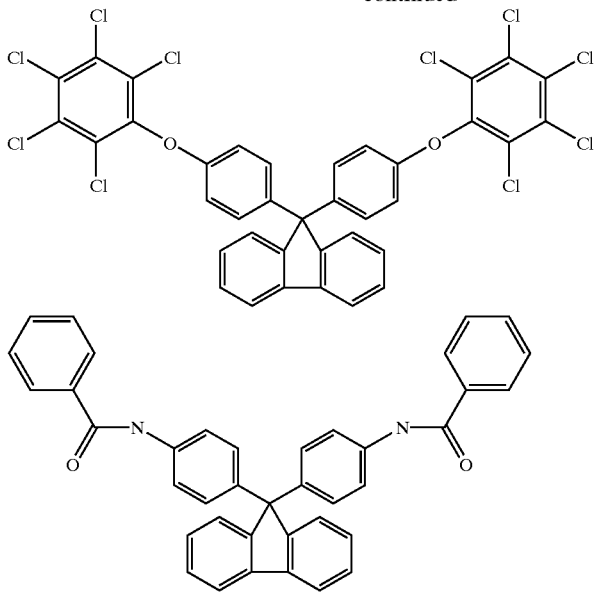

Examples of molecules which constitute the particles having two components of polarization anisotropy and plane structural groups other than fluorene groups include the following:

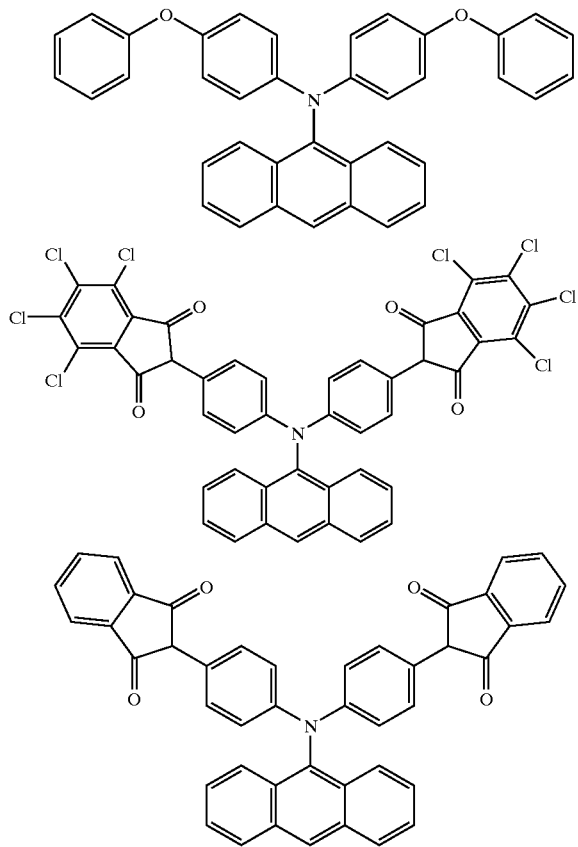

The particles may be composed of either a low-molecular-weight molecular or a high-molecular-weight molecule such as oligomer or polymer. Namely, the particles may be composed of a polymer having plane structural groups such as fluorene groups in the side chains thereof. For example, in order to obtain polyimide particles from a polyimide precursor having plate structural groups in the sides chains, a solution of polyamic acid as the polyimide precursor is imidated by heating to 140 to 230° C., and the resultant powder is micronized by salt milling or the like to obtain the polyimide particles. The plane structural groups such as fluorene groups may be contained in the molecular chain of the polymer.

The particles having quinolyl groups are next described. The quinolyl groups generally represent groups having quinoline represented by formula (2) below in the skeletons thereof, and of course include groups each having a substituent such as a hydrocarbon groups, a halogen, or the like. As a substituent, a monovalent group to be bonded at any of the positions 1 to 8 can be used, but a bivalent group to be bonded at the position 2 is preferred from the viewpoint of the orientation suppressing effect.

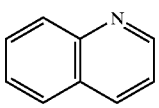
(2)

Particularly, quinophthalone derivatives represented by the formula (3) below are preferred from the viewpoint of the orientation suppressing effect.

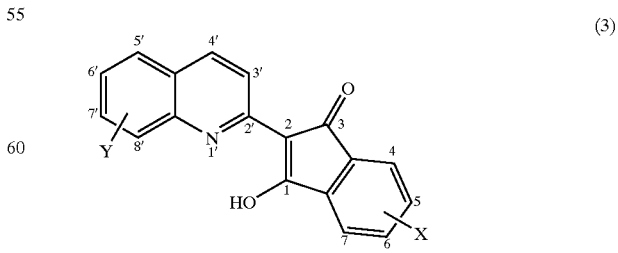
(3)

(X represents hydrogen or a halogen, and Y represents an organic group having 1 to 30 carbon atoms as a substituent).

Examples of the quinophthalone derivatives include compounds in which the substituent Y is a phenyl group, a biphenyl group, a naphthalene group, or a phthalimido group, and compounds in which a phenyl group, a biphenyl group, a naphthalene group, or a phthalimido group as the substituent Y has a halogen substituent.

The particles for reducing birefringence preferably have a halogen group. The molecule Containing a halogen group has the effect of increasing the polarization anisotropy in a direction different from the direction of polarization anisotropy of the polymer. The particles preferably have at two halogen groups, and the substituent groups are preferably opposed to each other in order to increase polarization. For example, halogen groups in a benzene ring are preferably substituted at para positions, as compared with ortho or meta positions. Examples of such derivatives include pigments of Color Index Nos. PY138, PR209, PR242, and PV23, and the like. Of these pigments, PY138 is preferred because of its good coloring effect as a yellow pigment, excellent weather resistance, and excellent heat resistance. The use of such pigments having the effect of reducing birefringence eliminates the need to add other particles for reducing birefringence, and is thus preferred from the viewpoint of decreases in the number of steps and cost. Of course, the pigment having the effect of reducing birefringence may be combined with other particles for reducing birefringence.

PY138

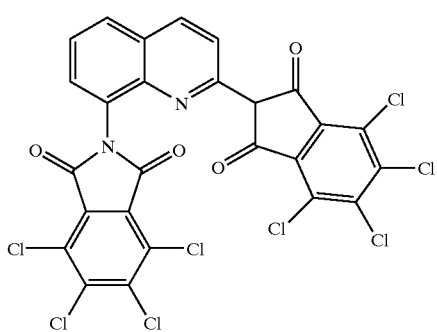

PV23

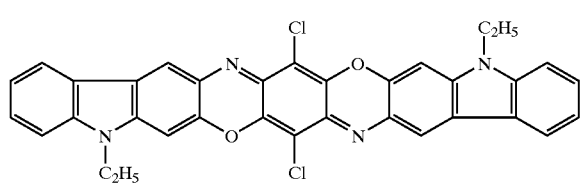

PR209

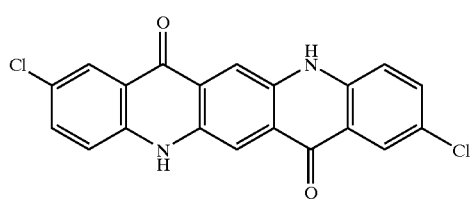

PR242

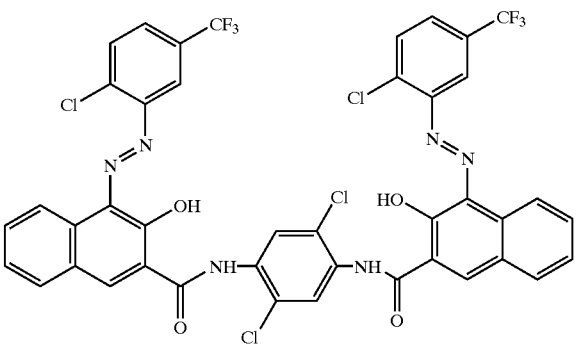

The content of the particles for reducing birefringence is preferably as high as possible from the viewpoint of the orientation suppressing effect. However, an excessively high content deteriorates the solvent resistance of the colored polymer thin film, and thus the content of the particles in the colored polymer thin film is 1 to 50% by weight, preferably 3 to 40% by weight, more preferably 5 to 30% by weight. Of course, the particles may be combined with the polymer having plane structural groups in the side chains thereof used in the first method. In this case, the orientation suppressing effect is further increased, thereby significantly decreasing birefringence.

The pigment having the effect of reducing birefringence may be combined with another pigment. Examples of other pigments are shown by Color Index (CI) Nos. Examples of yellow pigments include Pigment Yellow (PY) 13, 17, 20, 24, 83, 86, 93, 94, 95, 109, 110, 117, 125, 137, 139, 147, 148, 153, 154, 166, 173, 185, and the like. Examples of orange pigments include Pigment Orange (PO) 13, 31, 36, 38, 40, 42, 43, 51, 55, 59, 61, 64, 65, and the like. Examples of red pigments include Pigment Red (PR) 9, 48, 97, 122, 123, 144, 149, 166, 168, 177, 180, 190, 192, 215, 216, 217, 220, 223, 224, 226, 227, 228, 240, 254, and the like. Examples of violet pigments include Pigment Violet (PV) 19, 29, 32, 33, 36, 37, 38, 40, 50, and the like. Examples of blue pigments include Pigment Blue (PB) 15 (15:3, 14:4, 15:6, and the like), 21, 22, 60, 64, and the like. Example of green pigments include Pigment Green (PG) 7, 10, 36, 47, and the like. Examples of black pigments include carbon black, Pigment Black 7, metal oxides such as titanium black, and the like. As the pigment, a pigment which is surface-treated by rosin treatment, acidic group treatment, basic group treatment, or the. like may be used according to demand. In order to improve adhesion to a resin black matrix, a pigment with surfaces coated with a resin may be used according to demand.

The pigment used in the present invention is micronized to an average particle diameter of 200 μm or less by salt milling or the like to increase the contrast of the colored polymer thin film, and thus the processed pigment is more preferably used. The micronized pigment preferably has a specific surface area in the range of 40 to 120 m$^2$/g (BET method). With a specific surface area of less than 40 m$^2$/g, the contrast is decreased, while with a specific surface area of over 120 m$^2$/g, the pigment undesirably readily aggregates. For example, in green pixels, a green colored film using PY138 not micronized has a contrast of 500 to 600, while a green colored film using PY138 micronized has a contrast of 900 to 1000.

Salt milling is described in detail below. A small amount of water-soluble organic solvent (B) is added as a lubricant to a mixture of an organic pigment and a water-soluble inorganic salt (A), and the resulting mixture is strongly kneaded by a kneader. The mixture is poured into water, and stirred by a high-speed mixer or the like to form a slurry. Next, the thus-formed slurry is filtered, washed with water, and if required, dried to obtain a fine pigment. In the salt milling, a resin (C) at least partially soluble in the water-soluble organic solvent (B) is also used to obtain a finer treated pigment which less aggregates in drying.

Although the inorganic salt (A) used is not limited as long as it is water-soluble, sodium chloride is preferably used from the viewpoint of cost. With respect to the mixing ratio of the inorganic salt and the pigment, the micronization efficiency increases as the amount ratio of the inorganic salt to the pigment increases, but the amount of the pigment treated one time is decreased. Therefore, it is necessary to determine the amount ratio from the viewpoints of both the processing efficiency and production efficiency. However, the weight ratio of the inorganic salt to the pigment is preferably 1 to 10.

The water-soluble organic solvent (B) is not limited as long as it is water-soluble and does not dissolve the inorganic salt (A). However, since the temperature is increased in salt milling to cause a state wherein the solvent easily evaporates, a high-boiling-point solvent is preferred from the viewpoint of safety. Examples of such organic solvents include 2-methoxyethanol, 2-butoxyethanol, 2-(isopentyloxy)ethanol, 2-(hexyloxy)ethanol, diethyleneglycol, diethyleneglycol monomethyl ether, diethyleneglycol monoethylglycol, diethyleneglycol monobutyl ether, triethyleneglycol, triethyleneglycol monomethyl ether, liquid polyethyleneglycol, 1-methoxy-2-propanol, 1-ethoxy-2-propanol, dipropyleneglycol, dipropyleneglycol monomethyl ether, dipropyleneglycol monoethyl ether, low-molecular-weight polypropyleneglycol, and the like.

The resin (C) is preferably solid at room temperature and water-insoluble, and must be at least partially soluble in the water-soluble organic solvent (B) used as the lubricant in salt milling, and a natural resin, a modified natural resin, a synthetic resin, a synthetic resin modified with a natural resin, and the like can be used. A typical example of natural resins is rosin, and examples of modified natural resins include rosin derivatives, cellulose derivatives, rubber derivatives, protein derivatives, and oligomers thereof. Examples of synthetic resins include epoxy resins, acrylic resin, maleic resins, butyral resins, polyester resins, melamine resins, phenolic resins, polyurethane resins, and the like. Examples of synthetic resins modified by natural resins include rosin-modified maleic resins, rosin-modified phenolic resins, and the like.

By using the colored polymer thin film of the present invention for pixels to form a color filter, a liquid crystal display exhibiting excellent display performance can be obtained. The color filter generally has pixels of the three colors including red, green and blue. The colored polymer thin film of the present invention can be used for any of the pixels of the color filter. Of course, the colored polymer thin film is preferably used for all pixels to obtain a liquid crystal display having further excellent display performance.

In forming the color filter by using the colored polymer thin film of the present invention, pigments of several colors are combined for toning, and used so that the pixels of the color filter satisfy the chromaticity of a CRT fluorescent material, or a black light and LCD liquid crystal properties. For example, for red pixels, a combination of PR177, PY83 and PY139, a combination of PR177 and P038, a combination of PR254 and P038, or a combination of PR254 and PY138 is used for control chromaticity, but a combination of PR254 and PY138 is more preferably used. In a combination of PR254 and PY138, the mixing ratios of PR254 and PY138 are 65 to 90% by weight and 10 to 35% by weight, respectively, preferably 70 to 85% by weight and 15 to 30% by weight, respectively. For green pixels, PG7 or PG36 is combined with any of the above yellow pigments, for example, PY17, PY83 or PY139, or PY138 for controlling chromaticity. From the viewpoint of chromaticity and reduction in birefringence of pixels, a combination of PG36 and PY138 is preferred. In such a combination of PG36 and PY138, the mixing ratios of PG36 and PY138 are 40 to 80% by weight and 20 to 60% by weight, respectively, preferably 50 to 70% by weight and 30 to 50% by weight, respectively. In this case, in order to finely control the chromaticity, PY139 may be added in an amount of 0.1 to 5% by weight, preferably 0.5 to 3% by weight, more preferably 1 to 2% by weight.

In order to improve contrast and finely control the chromaticity, 5 to 50% by weight of PY138 may be replaced by PY150. With an amount of replacement of over 50% by weight, the effect of reducing birefringence undesirably deteriorates.

The color reproduction range of a color filter used for a monitor can be shown by the area of a triangle formed by connecting the chromaticities of the red pixels, the green pixels, and the blue pixels on chromaticity coordinates. The reproducibility of the color filter can be shown by a ratio of the color reproduction range of the color filter to the reproduction range of NTSC as a standard color of CRT. A color filter for a notebook-size personal computer has a reproducibility of about 40%, while a color filter for a monitor preferably has a reproducibility of 50% or more, and Y of 23.5 or more, which indicates the luminous transmittance of white.

Therefore, the chromaticity coordinates of red, green and blue pixels of the color filter for a monitor are preferably in the following ranges.

Red pixel x=0.600 to 0.680, y=0.300 to 0.400
Green pixel x=0.2500 to 0.350, y=0.570 to 0.650
Blue pixel x=0.100 to 0.180, y=0.080 to 0.160

These chromaticity coordinates were measured with a field of view of 2°, and a C light source.

Although the contrast tends to decrease as the reproducibility of the color filter increases, a liquid crystal display using a color filter having low contrast exhibits poor display quality. Therefore, the color filter preferably has contrast of 500 or more, more preferably 600 or more.

The color filter of the present invention preferably comprise a polymer having at least one type group selected from primary to tertiary amino groups, amido groups, imido groups, ureylene groups, and imino groups, from the viewpoint that the resin contained in the red, green and blue pixels stabilizes dispersion of the fine pigments used as colorants, and increases the contrast of the color filter. This polymer has not only the function as a matrix material, but also the function as a dispersing agent for the pigments.

In producing the colored polymer thin film, color paste in which the pigment is dispersed in a solution containing the polymer dissolved in a solvent is generally used.

As the solvent used for the color paste, water and general organic solvents can be used. For polyimide as a polymer material, a solvent which dissolves the polyimide precursor is preferably used. Examples of solvents which dissolve the polyimide precursor include polar organic solvents such as amides such as N,N-dimethylacetamide, N,N-dimethylformamide, and the like; lactones such as γ-butyrolactone, and the like; pyrrolidones such as 2-pyrrolidone, N-methyl-2-pyrrolidone, and the like. In general, an organic solvent which does not dissolve the polyimide precursor by itself, for example, an alcohol such as ethanol, butanol, isopropanol, or the like, cellosolve such as methyl cellosolve, ethyl cellosolve, or the like, a propyleneglycol derivative such as propyleneglycol monomethyl ether, or the like, can be mixed with the solvent which dissolves the polyimide precursor. In order to improve the effect of dispersing the pigment, a solvent containing lactone as a main component is preferred. Although the amount of the solvent used is not limited, the amount sufficient for dissolving the polymer and causing appropriate viscosity is preferred.

The color paste is produced by the method of dispersing a pigment directly in a polymer solution by using a dispersing machine, or the method of dispersing a pigment in water or an organic solvent by using the dispersing machine, and then mixing the resultant dispersion with a polymer solution. As the method of dispersing the pigment, various methods such as a ball mill, a sand grinder, a three-roll mill, a high-speed impact mill, and the like can be used.

In the color paste, the resin and pigment are mixed at a weight ratio in the range of 2:8 to 9:1, preferably 3:7 to 8:2, more preferably 4:6 to 7:3. An excessively small amount of resin causes the probability of deteriorating the adhesion between the colored polymer thin film and a substrate, while an excessively small amount of pigment causes the problem of the degree of coloring.

In order to improve the coating ability of the color paste and surface uniformity of the colored film, or improve the dispersibility of the pigment, a surfactant can be added to the color paste. The amount of the surfactant added is generally 0.001 to 10% by weight, preferably 0.01 to 1% by weight, based on the pigment. An excessively small amount of surfactant exhibits none of the effects of improving the coating ability, and surface uniformity of the colored polymer thin film, and improving the dispersibility of the pigment, while an excessively large amount of surfactant deteriorates the coating ability or causes aggregation of the pigment in some cases. Examples of the surfactant include anion surfactants such as ammonium lauryl sulfate, triethanolamine polyoxyethylene alkyl ether sulfate, and the like; cation surfactants such as stearylamine acetate, lauryl trimethylammonium chloride, and the like; amphoteric surfactants such as lauryl dimethylamine oxide, lauryl carboxymethylhydroxyethylimidazolium betaine, and the like; nonionic surfactants such as polyoxyethylene lauryl ether, polyoxyethylene stearyl ether, sorbitan monostearate, and the like. In the present invention, the surfactant is not limited to these surfactants, and one or at least two surfactants may be used. The surfactant can also be added during the step of dispersing the pigment, or at any time before or after the step. However, in some cases, the dispersibility of the pigment changes with the time of addition, and thus care must be taken to the addition.

As the method of coating the color paste on the substrate, various methods such as the method of coating the substrate by a spin coater, a bar coater, a blade coater, a roll coater, a die coater, or screen printing, the method of dipping the substrate in the color paste, the method of spraying the color paste on the substrate, and the like can be used. As the substrate, a transparent substrate of soda glass, non-alkali glass, borosilicate glass, quartz glass, or the like, a semiconductor substrate of silicon, gallium-arsenic, or the like can be used, but the substrate is not limited to these materials. In coating the color paste on the substrate, the adhesive force between the thin film and the substrate can be increased by treating the surface of the substrate with an adhesive auxiliary such as a silane coupling agent or the like.

The colored polymer thin film formed by using the color paste generally has a thickness of 0.1 to 10 $\mu$m. preferably 0.5 to 5 $\mu$m. With an excessively small thickness, light absorption is excessively decreased, and thus optical properties are not satisfied. With an excessively large thickness, cracks occur due to the insufficient strength of the film, the film is not readily cured, or a problem occurs, in which the optical properties are not satisfied due to high absorption of light. In use for a liquid crystal display color filter, the colored polymer thin film preferably has a thickness of 1.0 to 2.0 $\mu$m.

Besides the color filter for a liquid crystal display, and an imaging element, the colored polymer thin film of the present invention can be used as a light shielding film of an optical element, a coating film for optical fibers, etc. For example, optical fibers coated with the colored polymer film by using the color paste can be used for an optical sensor under high temperatures.

An example of the method of producing the color filter is described below.

The color paste is coated on the substrate by the above-described method, and then dried by air drying, heat drying or vacuum drying to form a polyimide precursor colored film. The heat drying is carried out by using an oven, a hot plate, or the like in the temperature range of 50 to 180° C., preferably 80 to 120° C., for 30 seconds to 3 hours. With an excessively low temperature, the solvent does not easily evaporate, while with an excessively high temperature, solubility in a developing solution deteriorates. The thus-obtained polyimide precursor colored film is patterned by normal wet etching. First, a positive photoresist is coated on the polyimide precursor colored film to form a photoresist coating. Then, a mask is placed on the photoresist coating, followed by irradiation with ultraviolet rays by using an exposure device. After exposure, the photoresist coating and the polyimide precursor colored film are simultaneously etched with a positive photoresist alkali developing solution. After etching, the unnecessary photoresist coating is separated.

The polyimide precursor colored film is then converted to a polyimide colored film by heat treatment. The heat treatment is performed continuously or step wisely in vacuum at 150 to 450° C., preferably 180 to 350° C., more preferably 200 to 320° C., for 0.5 to 5 hours. The above-mentioned steps are performed for color pastes of the three colors, i.e., red, green, and blue, to produce a color filter for a liquid crystal display comprising pixels composed of the colored polymer thin film having the three colors including red, green and blue.

In the liquid crystal display color filter, a black matrix comprising a light shielding film may be arranged between the respective pixels. The arrangement of the black matrix can improve the contrast of the liquid crystal display, and prevent optical error in the operation of a driving element of the liquid crystal display. As the black matrix, a metal black matrix, a resin black matrix, and the like can be used. For example, the resin black matrix can be produced by coating black color paste, drying, etching, and then heat treatment in the same manner as the method of producing the polyimide colored film.

A fixed spacer may be formed on the liquid crystal display substrate comprising the color filter. The fixed spacer is fixed at a specified position of the liquid crystal display substrate so as to contact a counter substrate in production of the liquid crystal display, as disclosed in Japanese Unexamined Patent Publication No. 4-318816. Therefore, a predetermined gap is maintained between the liquid crystal display substrate and the counter substrate so that a liquid crystal is injected into the gap. By providing the fixed spacer, it is possible to omit the step of dispersing spherical spacers, and the step of kneading rod-shaped spacers in a sealing agent in the process for producing the liquid crystal display.

The fixed spacer is formed by photolithography, printing, electrode position, or the like. The spacer is preferably formed by photolithography because the spacer can easily be formed at the designed position.

In the present invention, after the resin black matrix is formed on the substrate, after the pixels are formed, or after the fixed spacer is formed, an overcoat film comprising acrylic polymer, polysiloxane, polyimide, or the like is preferably formed.

In coating on a substrate having unevenness, the overcoat film has the tendency that it is thick in recessed portions (lower portions than the peripheries), and thin in projecting portions (higher portions than the peripheries) according to the leveling property of an overcoat agent. The thickness of the overcoat film is 0.01 to 5 µm, more preferably 0.03 to 4 µm, most preferably 0.04 to 3 µm.

A liquid crystal display in which the color filter is combined with a liquid crystal display substrate comprising thin film transistors exhibits high display quality. Particularly, in a liquid crystal display for a monitor which is adapted for widening the viewing angle, such as a transverse electric field driving system (IPS system), a multi-domain vertical alignment system (MVA system), a viewing-angle enlargement film system, etc., the effect of the present invention becomes further significant.

The method of the present invention can not only decrease retardation, but also decrease retardation to a negative value. Therefore, the absolute value of retardation can be made substantially zero, and retardation can also be controlled in a positive or negative specified range.

Although the present invention is described in detail below with reference to examples, the present invention is not limited to these examples. The measurement method performed in the examples is as follows:

MEASUREMENT METHOD

<Chromaticity>

Chromaticity was measured by OTSUKA ELECTRONICS Co. Ltd., Multi Channel Photo Detector MCPD-2000.

<Contrast>

The luminance of a sample were measured by parallel Nicols and crossed Nicols with a viewing angle of 2° on a back light (Aketaku System) using a color luminance meter ("Topcon" BM-5A), and the luminance ratio of parallel Nicols and crossed Nicols was determined as contrast.

<Thickness>

The thickness was measured by TOKYO SEIMITSU Surface Texture Measuring Instrument SURFCOM 1500A.

<Refractive Index, Birefringence, Retardation>

The refractive indexes $n_{TE}$ and $n_{TM}$ were measured by Metricon Corp., Prism Coupler Model PC-2010 with light at each of wavelengths of 610 nm for the red colored thin film, 546 nm for the green colored thin film, and 430 nm for the blue colored thin film. The average refractive index, birefringence and retardation were calculated from the refractive index values obtained.

$n_{xy}$: Refractive index when the vibration direction of light is parallel to the film plane of a thin film;

$n_z$: Refractive index when the vibration direction of light is perpendicular to the film plane of a thin film;

d: Thickness of a thin film

Average refractive index (avg)=$(2n_{xy}+n_z)/3$ Birefringence $\Delta n=n_{xy}-n_z$ Retardation: Product of birefringence and film thickness ($\Delta n \times d$)

A. Synthesis Example of Polyamic Acid Solution

Synthesis was carried out by using a reaction vessel provided with a thermometer, a dry nitrogen inlet, a hot-water heating/cooling-water cooling device, and a stirrer.

PRODUCTION EXAMPLE 1

330.6 g (0.95 mol) of FDA, and 12.4 g (0.05 mol) of SiDA were charged together with 2606 g of γ-butyrolactone, and 306.9 g (0.99 mol) of ODPA was added to the resulting mixture, followed by reaction at 70° C. for 3 hours. 1.95 g (0.02 mol) of maleic anhydride was added to the reaction mixture, followed by further reaction at 70° C. for 2 hours. Then, 1086 g of γ-butyrolactone was added to the reaction mixture to dilute it, to obtain a 15% polyamic acid solution (PA-1) having a viscosity of 80 centipoise (25° C.).

PRODUCTION EXAMPLE 2

150.0 g (0.75 mol) of DAE, 49.6 g (0.20 mol) of DDS, and 12.4 g (0.05 mol) of SiDA were charged together with 2730 g of γ-butyrolactone, and 161.0 g (0.50 mol) of BTDA and 106.8 g (0.49 mol) of PMDA were added to the resulting mixture, followed by reaction at 60° C. for 5 hours. 1.96 g (0.02 mol) of maleic anhydride was added to the reaction mixture, followed by further reaction at 60° C. for 1 hour to obtain a 15% polyamic acid solution (PA-2) having a viscosity of 15 poise (25° C.).

PRODUCTION EXAMPLE 3

60.0 g (0.30 mol) of DAE, 70.2 g (0.65 mol) of PDA, and 12.4 g (0.05 mol) of SiDA were charged together with 738 g of γ-butyrolactone and 738 g of N-methyl-2-pyrrolidone, and 309.2 g (0.9975 mol) of ODPA, 166 g of γ-butyrolactone and 166 g of N-methyl-2-pyrrolidone were added to the resulting mixture, followed by reaction at 80° C. for 3 hours. 0.49 g (0.005 mol) of maleic anhydride was added to the reaction mixture, followed by further reaction at 80° C. for 3 hours to obtain a 20% polyamic acid solution (PA-3) having a viscosity of 20 poise (25° C.).

PRODUCTION EXAMPLE 4

117.8 g (0.475 mol) of DDS, 107.8 g (0.475 mol) of DABA, and 12.4 g (0.05 mol) of SiDA were charged together with 2161 g of γ-butyrolactone and 427 g of N-methyl-2-pyrrolidone, and 288.1 g (0.98 mol) of BPDA was added to the resulting mixture, followed by reaction at 60° C. for 3 hours. 3.9 g (0.04 mol) of maleic anhydride was added to the reaction mixture, followed by further reaction at 60° C. for 2 hours to obtain a 17% polyamic acid solution (PA-4) having a viscosity of 20 poise (25° C).

PRODUCTION EXAMPLE 5

190 g (0.95 mol) of DAE and 12.4 g (0.05 mol) of SiDA were charged together with 2163 g of γ-butyrolactone and 427 g of N-methyl-2-pyrrolidone, and 285.2 g (0.97 mol) of BPDA was added to the resulting mixture, followed by reaction at 70° C. for 3 hours. 5.9 g (0.06 mol) of maleic anhydride was added to the reaction mixture, followed by further reaction at 70° C. for 2 hours to obtain a 16% polyamic acid solution (PA-5) having a viscosity of 100 poise (25° C.).

PRODUCTION EXAMPLE 6

600.7 g of DAE, 670.2 g of DDS, and 74.6 g of SiDA were charged together with 16644.1 g of γ-butyrolactone, and the resultaing mixture was heated to 30° C. 30 minutes after, 644.4 g of BTDA, 641.3 g of PMDA, and 294.2 g of BPDA were added to the mixture, followed by heating to 58° C. 3 hours after, 11.8 g of maleic anhydride was added to the reaction mixture, followed by further heating at 58° C. for 1 hour to obtain a polyamic acid solution (PA-6) in N-methyl-2-pyrrolidone.

PRODUCTION EXAMPLE 7

Synthesis was carried out by using a reaction vessel provided with a thermometer, a dry nitrogen inlet, a hot-water heating/cooling-water cooling device, and a stirrer.

100.0 g of 1-propanol, and 0.3 g of n-lauryl mercaptan were poured into the reaction vessel, and the resultant mixture was heated to 80° C. Then, 41.7 g (0.40 mol) of styrene, 42.1 g (0.40 mol) of methyl metacrylate, 17.2 g (0.20 mol) of methacrylic acid, and 1.0 g of 2,2'-azobis (isobutyronitrile) were added dropwise to the reaction vessel by using a dropping funnel, followed by reaction at 80° C. for 2 hours.

The thus-obtained polymer solution was added to a large amount of n-hexane to precipitate, and then filtered to obtain a white solid crude polymer. Then, the obtained crude polymer was dissolved in 200 g of ethyl cellosolve, and blended with water. The resultant precipitates were filtered off, and dried to obtain a purified polymer powder.

The thus-obtained purified polymer powder was dissolved in propoyleneglycol monomethyl ether acetate under heating so that the concentration was 20% by weight to obtain a 20% acrylic polymer solution (AP-1).

B. Production Examples of Fine Particles

PRODUCTION EXAMPLE 8

348.0 g (1.00 mol) of FDA and 2606 g of γ-butyrolactone were charged in a reaction vessel provided with a thermometer, a dry nitrogen inlet, a hot-water heating/cooling-water cooling device, and a stirrer, and 306.9 g (0.99 mol) of ODPA was added to the resulting mixture, followed by reaction at 70° C. for 3 hours. 1.95 g (0.02 mol) of maleic anhydride was added to the reaction mixture, followed by further reaction at 70° C. for 2 hours. Then, 1120 g of γ-butyrolactone was added to the reaction mixture to dilute it, to obtain a 15% polyamic acid solution having a viscosity of 80 centipoise (25° C.).

1740 g of the thus-obtained polyamic acid solution was added dropwise to water under stirring with a mixer to precipitate solid polyamic acid. The resultant solid polyamic acid was dried in vacuum at 140° C. for 20 minutes, and then imidated by heating in vacuum at 25° C. for 40 minutes to obtain a polyimide powder.

250.0 g of the resulting polyimide powder, 700 g of sodium chloride, and 160 g of polyethylene glycol were kneaded by a three-roll mill for 3 hours. Next, the resulting mixture was poured into about 3 L of hot water, and the mixture was stirred by a high-speed mixer under heating at 80° C. for 1 hour to obtain a slurry. The thus-obtained slurry was filtered, and washed with water to remove sodium chloride and polyethylene glycol, and then dried in vacuum in a hot-air oven at 60° C. for 24 hours to obtain fine particles (DP-1).

PRODUCTION EXAMPLE 9

250.0 g of solid quinophthalone derivative represented by the formula below, 700 g of sodium chloride, 107 g of rosin-modified maleic acid resin, and 160 g of polyethylene glycol were kneaded by a three-roll mill for 3 hours. Next, the resultant mixture was poured into about 3 L of hot water, and then stirred by a high-speed mixer for 1 hour under heating to 80° C. to form a slurry. The thus-obtained slurry was filtered, and washed with water to remove sodium chloride and polyethylene glycol, and then dried in vacuum in a hot-air oven at 60° C. for 24 hours to obtain fine particles (DP-2).

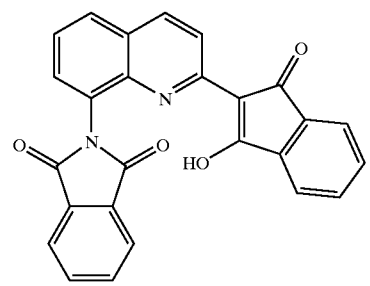

C. Example of Pigment Micronization 250.0 g of PY138, 700 g of sodium chloride, 107 g of rosin-modified maleic acid resin, and 160 g of polyethylene glycol were kneaded by a three-roll mill for 3 hours. Next, the resultant mixture was poured into about 3 L of hot water, and then stirred by a high-speed mixer for 1 hour under heating to 80° C. to form a slurry. The thus-obtained slurry was filtered, and washed with water to remove sodium chloride and polyethylene glycol, and then dried in vacuum in a hot-air oven at 60° C. for 24 hours to obtain treated pigment PY138 (B). The specific surface area before treatment was 24 $m^2/g$ (BET method), while the specific surface area after treatment was 84 $m^2/g$ (BET method).

D. Formation of Blue Colored Polymer Thin Film

EXAMPLE 1

146.3 g of PB15:6, 480.0 g of γ-butyrolactone, 480.0 g of N-methyl-2-pyrrolidone, 393.8 g of polyamic acid solution (PA-3), and 1860 g of glass beads were dispersed by using a mill-type dispersing machine at 3200 rpm for 3 hours, and then the glass beads were filtered off to obtain 1500 g of 15% blue dispersion (BP-1).

81.3 g of polyamic acid solution (PA-3) and 26.3 g of (PA-1) were diluted with 50.6 g of γ-butyrolactone, 149.6 g of N-methyl-2-pyrrolidone, and 69.4 g of 3-methyl-3-methoxybutanol acetate, and the resultant diluted solution was added to 115.4 g of dispersion (BP-1), and mixed therewith to obtain 493 g of 7.6% blue paste (BC-1).

The thus-obtained blue paste (BC-1) was coated on a glass substrate by a spinner so that chromaticity after film curing was y=0.14. The coating was then dried in air by using an oven at 120° C. for 20 minutes, and then heat-treated at 280° C. for 40 minutes to obtain a blue colored polymer thin film. The thickness, refractive index, birefringence and retardation of the thus-obtained blue colored polymer thin film are shown in Table 1.

EXAMPLE 2

36.3 g of polyamic acid solution (PA-3) and 89.8 g of (PA-1) were diluted with 12.6 g of γ-butyrolactone, 4.4 g of N-methyl-2-pyrrolidone, 230.8 g of 3-methyl-3-methoxybutanol, and 7.7 g of γ-butyrolactone containing 1% of surfactant Megafax R-08 (produced by Dainippon Ink and Chemicals Incorporated), and the resultant diluted solution was added to 118.5 g of dispersion (BP-1), and mixed therewith to obtain 500 g of 7.7% blue paste (BC-2).

A blue colored polymer thin film was obtained by the same method as Example 1 except that the resulting blue paste (BC-2) was used. The thickness, refractive index, birefringence and retardation of the thus-obtained blue colored polymer thin film are shown in Table 1.

EXAMPLE 3

139.03 g of PB15:6, 7.3 g of PV23, 480.0 g of γ-butyrolactone, 480.0 g of N-methyl-2-pyrrolidone, 393.8 g of polyamic acid solution (PA-3), and 1860 g of glass beads were dispersed by using a mill-type dispersing machine at 3200 rpm for 3 hours, and then the glass beads were filtered off to obtain 1500 g of 15% blue dispersion (BP-2).

The same procedure as Example 1 was repeated except that the dispersion (BP-1) was changed to (BP-2) to obtain 493 g of 7.6% blue paste (BC-3), and a blue colored polymer thin film. The thickness, refractive index, birefringence and retardation of the thus-obtained blue colored polymer thin film are shown in Table 1.

EXAMPLE 4

146.3 g of PB15:6, 51.8 g of fine particles (DP-1), 480.0 g of γ-butyrolactone, 480.0 g of N-methyl-2-pyrrolidone, 393.8 g of polyamic acid solution (PA-3), and 1860 g of glass beads were dispersed by using a mill-type dispersing machine at 3200 rpm for 3 hours, and then the glass beads were filtered off to obtain 1552 g of 17.8% blue dispersion (BP-3).

71.9 g of polyamic acid solution (PA-3) was diluted with 79.1 g of γ-butyrolactone, 151.2 g of N-methyl-2-pyrrolidone, and 72.1 g of 3-methyl-3-methoxybutanol acetate, and the resultant diluted solution was added to 141.9 g of dispersion (BP-3), and mixed therewith to obtain 516 g of 7.7% blue paste (BC-5).

A blue colored polymer thin film was obtained by the same method as Example 1 except that the resulting blue paste (BC-5) was used. The thickness, refractive index, birefringence and retardation of the thus-obtained blue colored polymer thin film are shown in Table 1.

COMPARATIVE EXAMPLE 2

95.6 g of polyamic acid solution (PA-3) was diluted with 69.6 g of γ-butyrolactone, 141.7 g of N-methyl-2-pyrrolidone, and 72.1 g of 3-methyl-3-methoxybutanol acetate, and the resultant diluted solution was added to 137.2 g of dispersion (BP-1) to obtain 516 g of 7.7% blue paste (BC-6).

A blue colored polymer thin film was obtained by the same method as Example 1 except that the resulting blue paste (BC-6) was used. The thickness, refractive index, birefringence and retardation of the thus-obtained blue colored polymer thin film are shown in Table 1.

E. Formation of Green Colored Polymer Thin Film

EXAMPLE 5

63.0 g of PG36, 27.0 g of PY138, 930.8 g of γ-butyrolactone, 346.8 g of 3-methyl-3-methoxybutanol, 132.4 g of polyamic acid solution (PA-4), and 1920 g of glass beads were dispersed by using a mill-type dispersing machine at 3200 rpm for 3 hours, and then the glass beads were filtered off to obtain 1500 g of 7.5% green dispersion (GP-1).

48.6 g of polyamic acid solution (PA-4) and 55.7 g of (PA-2) were diluted with 72.6 g of γ-butyrolactone and 38.0 g of γ-butyrolactone containing 0.1% of surfactant BYK361 (produced by BYK-Chemical), and the resultant diluted solution was added to 285.0 g of dispersion (GP-1), and mixed therewith to obtain 500 g of 7.6% green paste (GC-1).

The thus-obtained green paste (GC-1) was coated on a glass substrate by a spinner so that chromaticity after film curing was y=0.58. The coating was then dried in air by using an oven at 120° C. for 20 minutes, and then heat-treated at 280° C. for 40 minutes to obtain a green colored polymer thin film. The thickness, refractive index, birefringence and retardation of the thus-obtained green colored polymer thin film are shown in Table 1.

EXAMPLE 6

70.2 g of PG36, 35.6 g of PY138, 2.2 g of PY139, 1312.0 g of γ-butyrolactone, 80.0 g of polyamic acid solution (PA-2), and 1920 g of glass beads were dispersed by using a mill-type dispersing machine at 4200 rpm for 3 hours, and then the glass beads were filtered off to obtain 1500 g of 8% green dispersion (GP-2).

72.7 g of polyamic acid solution (PA-2), 19.0 g of (PA-4) and 26.9 g of (PA-1) were diluted with 30.7 g of γ-butyrolactone, 64.7 g of 3-methyl-3-methoxybutanol, and 38.0 g of γ-butyrolactone containing 0.1% of surfactant BYK361 (produced by BYK-Chemical), and the resultant diluted solution was added to 248.1 g of dispersion (GP-2), and mixed therewith to obtain 500 g of 7.6% green paste (GC-2).

A green colored polymer thin film was obtained by the same method as Example 5 except that the resulting green paste (GC-2) was used. The thickness, refractive index, birefringence and retardation of the thus-obtained green colored polymer thin film are shown in Table 1.

EXAMPLE 7

58.5 g of PG36, 31.5 g of PY138, 1056.4 g of 3-methyl-3-methoxybutanol, 225.0 g of 20% acrylic polymer solution (AP-1, solvent: 3-methyl-3-methoxybutanol), 128.6 g of 35% modified polyurethane solution EFKA47 (produced by EFKA), and 1920-g of glass beads were dispersed by using a mill-type dispersing machine at 1500 rpm for 3 hours, and then the glass beads were filtered off to obtain 1500 g of 12% green dispersion (GP-3).

15.9 g of 20% acrylic polymer solution (AP-1), 33.1 g of 20% BPEFA solution (solvent: propyleneglycol monomethyl ether), and 10.5 g of Ligacure 369 (produced by Chiba Specialty Chemicals) were diluted with 3.5 g of propyleneglycol monomethyl ether containing 20% of KBM1003 (produced by Shinetsu Silicone) and 28.0 g of propyleneglyocl monomethyl ether, and the resultant diluted solution was added to 408.4 g of dispersion (GP-3), and mixed therewith to obtain 500 g of 14% green paste (GC-3).

A green colored polymer thin film was obtained by the same method as Example 5 except that the resulting green paste (GC-3) was used. The thickness, refractive index, birefringence and retardation of the thus-obtained green colored polymer thin film are shown in Table 1.

COMPARATIVE EXAMPLE 3

63.0 g of PG36, 22.5 g of PY17, 4.5 g of PY129, 930.8 g of γ-butyrolactone, 346.8 g of 3-methyl-3-methoxybutanol, 132.4 g of polyamic acid solution (PA-4), and 1920 g of glass beads were dispersed by using a mill-type dispersing machine at 3200 rpm for 2 hours, and then the glass beads were filtered off to obtain 1500 g of 7.5% green dispersion (GP-4).

66.2 g of polyamic acid solution (PA-4) was diluted with 46.3 g of γ-butyrolactone, and 37.5 g of γ-butyrolactone containing 0.1% of surfactant BYK361 (produced by BYK-Chemical), and the resultant diluted solution was added to 350.0 g of dispersion (GP-4), and mixed therewith to obtain 500 g of 7.5% green paste (GC-4).

A green colored polymer thin film was obtained by the same method as Example 5 except that the resulting green paste (GC-4) was used. The thickness, refractive index, birefringence and retardation of the thus-obtained green colored polymer thin film are shown in Table 1.

EXAMPLE 8

The same procedure as Example 5 was repeated except that PY138 was changed to PY138(B) to produce a dispersion (BP-5), green paste (GC-5), and a green colored polymer thin film. The thickness, refractive index, birefringence and retardation of the thus-obtained green colored polymer thin film are shown in Table 1.

EXAMPLE 9

54.0 g of PG36, 36.0 g of fine particles (DP-2), 930.8 g of γ-butyrolactone, 346.8 g of 3-methyl-3-methoxybutanol, 132.4 g of polyamic acid solution (PA-4), and 1920 g of zirconia beads were dispersed by using a mill-type dispersing machine at 3200 rpm for 2 hours, and then the glass beads were filtered off to obtain 1500 g of 7.5% green dispersion (GP-6).

50.6 g of polyamic acid solution (PA-4) and 58.0 g of (PA-2) were diluted with 101.9 g of γ-butyrolactone, and 13.1 g of 3-methyl-3-methoxybutanol, and the resultant diluted solution was added to 296.4 g of dispersion (GP-6), and mixed therewith to obtain 520 g of 7.6% green paste (GC-6).

A green colored polymer thin film was obtained by the same method as Example 5 except that the resulting green paste (GC-6) was used. The thickness, refractive index, birefringence and retardation of the thus-obtained green colored polymer thin film are shown in Table 1.

COMPARATIVE EXAMPLE 4

The same procedure as Example 5 was repeated except that PY138 was changed to PY17 to produce a dispersion (BP-7), green paste (GC-7), and a green colored polymer thin film. The thickness, refractive index, birefringence and retardation of the thus-obtained green colored polymer thin film are shown in Table 1.

F. Formation of Red Colored Polymer Thin Film

EXAMPLE 10

72.0 g of PR254, 18.0 g of PY138, 930.8 g of γ-butyrolactone, 346.8 g of 3-methyl-3-methoxybutanol, 132.4 g of polyamic acid solution (PA-4), and 1920 g of glass beads were dispersed by using a mill-type dispersing machine at 4200 rpm for 3 hours, and then the glass beads were filtered off to obtain 1500 g of 7.5% red dispersion (RP-1).

2.0 g of polyamic acid solution (PA-4), 35.6 g of (PA-5), and 15.2 g of (PA-1) were diluted with 45.5 g of γ-butyrolactone, 7.7 g of 3-methyl-3-methoxybutanol, and 22.8 g of γ-butyrolactone containing 0.1% of surfactant BYK361 (produced by BYK-Chemical), and the resultant diluted solution was added to 152.0 g of dispersion (RP-1), and mixed therewith to obtain 280 g of 7.0% red paste (RC-1).

The thus-obtained red paste (RC-1) was coated on a glass substrate by a spinner so that chromaticity after film curing was y=0.62. The coating was then dried in air by using an oven at 120° C. for 20 minutes, and then heat-treated at 280° C. for 40 minutes to obtain a red colored polymer thin film. The thickness, refractive index, birefringence and retardation of the thus-obtained red colored polymer thin film are shown in Table 1.

EXAMPLE 11

75.6 g of PR254, 10.8 g of PR177, 21.6 g of PY138, 967.0 g of γ-butyrolactone, 345.0 g of 3-methyl-3-methoxybutanol, 80.0 g of polyamic acid solution (PA-2), and 1920 g of glass beads were dispersed by using a mill-type dispersing machine at 4200 rpm for 3 hours, and then the glass beads were filtered off to obtain 1500 g of 8% red dispersion (RP-2).

48.8 g of polyamic acid solution (PA-2), 12.3 g of (PA-4), and 69.5 g of (PA-1) were diluted with 157.9 g of γ-butyrolactone, 54.4 g of 3-methyl-3-methoxybutanol, and 30.0 g of γ-butyrolactone containing 0.1% of surfactant BYK361 (produced by BYK-Chemical), and the resultant diluted solution was added to 127.1 g of dispersion (RP-2), and mixed therewith to obtain 500 g of 6% red paste (RC-2).

A red colored polymer thin film was obtained by the same method as Example 10 except that the resulting red paste (RC-2) was used. The thickness, refractive index, birefringence and retardation of the thus-obtained red colored polymer thin film are shown in Table 1.

EXAMPLE 12

49.1 g of PR254, 11.3 g of PR122, 32.4 g of PR209, 15.1 g of PY138, 967.0 g of γ-butyrolactone, 345.0 g of 3-methyl-3-methoxybutanol, 80.0 g of polyamic acid solution (PA-2), and 1920 g of glass beads were dispersed by using a mill-type dispersing machine at 4200 rpm for 3 hours, and then the glass beads were filtered off to obtain 1500 g of 8% red dispersion (RP-3).

74.2 g of polyamic acid solution (PA-2), 18.4 g of (PA-4), and 11.6 g of (PA-1) were diluted with 147.4 g of γ-butyrolactone, 43.4 g of 3-methyl-3-methoxybutanol, and 30.0 g of γ-butyrolactone containing 0.1% of surfactant BYK361 (produced by BYK-Chemical), and the resultant diluted solution was added to 175.0 g of dispersion (RP-3), and mixed therewith to obtain 500 g of 6% red paste (RC-3).

A red colored polymer thin film was obtained by the same method as Example 10 except that the resulting red paste (RC-3) was used. The thickness, refractive index, birefringence and retardation of the thus-obtained red colored polymer thin film are shown in Table 1.

COMPARATIVE EXAMPLE 5

99.0 g of PR177, 231.0 g of P038, 317.6 g of γ-butyrolactone, 1261.6 g of 3-methyl-3-methoxybutanol, 679.4 g of polyamic acid solution (PA-4), and 1200 g of glass beads were dispersed by using a mill-type dispersing machine at 2500 rpm for 8 hours, and then the glass beads were filtered off to obtain 5500 g of 8.2% red dispersion (RP-4).

191.35 g of γ-aminopropyldiethoxysilane was reacted with 150.3 g of γ-butyrolactone, 150.3 g of 3-methoxy-3-methylbutanol and 9.0 g of water at 60° C. for 3 hours to obtain a hydrolytic partial condensation product solution (S-1) of 40% organosilane compound.

37.0 g of polyamic acid solution (PA-5) and 9.4 g of hydrolytic partial condensation product solution (S-1) of 40% organosilane compound were diluted with 13.9 g of γ-butyrolactone, 90.9 g of 3-methyl-3-methoxybutanol, and 11.3 g of γ-butyrolactone containing 0.1% of surfactant BYK361 (produced by BYK-Chemical), and the resultant diluted solution was added to 337.5 g of dispersion (RP-4), and mixed therewith to obtain 500 g of 7.5% red paste (RC-4).

A red colored polymer thin film was obtained by the same method as Example 10 except that the resulting red paste (RC-4) was used. The thickness, refractive index, birefringence and retardation of the thus-obtained red colored polymer thin film are shown in Table 1.

EXAMPLE 13

63.0 g of PR254, 27.0 g of PY138, 930.8 g of γ-butyrolactone, 346.8 g of 3-methyl-3-methoxybutanol, 132.4 g of polyamic acid solution (PA-4), and 1920 g of glass beads were dispersed by using a mill-type dispersing machine at 4200 rpm for 3 hours, and then the glass beads were filtered off to obtain 1500 g of 7.5% red dispersion (.RP-5).

160.6 g of polyamic acid solution (PA-5) was diluted with 102.4 g of γ-butyrolactone, and 72.7 g of 3-methyl-3-methoxybutanol, and the resultant diluted solution was added to 184.4 g of dispersion (RP-5), and mixed therewith to obtain 520 g of 7.6% red paste (RC-5).

A red colored polymer thin film was obtained by the same method as Example 10 except that the resulting red paste (RC-5) was used. The thickness, refractive index, birefringence and retardation of the thus-obtained red colored polymer thin film are shown in Table 1.

EXAMPLE 14

The same procedure as Example 13 was repeated except that PY138 was changed to PY138(B) to produce a dispersion (RP-6), red paste (RC-6), and a red colored polymer thin film. The thickness, refractive index, birefringence and retardation of the thus-obtained red colored polymer thin film are shown in Table 1.

EXAMPLE 15

The same procedure as Example 13 was repeated except that PY138 was changed to fine particles (DP-1) to produce a dispersion (RP-7), red paste (RC-7), and a red colored polymer thin film. The thickness, refractive index, birefringence and retardation of the thus-obtained red colored polymer thin film are shown in Table. 1.

COMPARATIVE EXAMPLE 6

The same procedure as Example 13 was repeated except that PY138 was changed to PY83 to produce a dispersion (RP-8), red paste (RC-8), and a red colored polymer thin film. The thickness, refractive index, birefringence and retardation of the thus-obtained red colored polymer thin film are shown in Table 1.

G. Formation of Color Filter and Evaluation of Liquid Crystal Display

EXAMPLE 16

A color filter was formed according to the following procedure:

G-1. Formation of Resin Black Matrix Layer 4.6 g of carbon black, 24.0 g of polyamic acid solution (PA-6), 61.4 g of N-methyl-2-pyrrolidone and 90.0 g of glass beads were dispersed by using a mill-type dispersing machine at 7000 rpm for 30 minutes, and then the glass beads are filtered off to obtain a carbon black mill base.

2.2 g of PB15:6, 24.0 g of polyamic acid solution (PA-6), 63.8 g of N-methyl-2-pyrrolidone and 90.0 g of glass beads were dispersed by using a mill-type dispersing machine at 7000 rpm for 30 minutes, and then the glass beads are filtered off to obtain a blue mill base.

Whole amounts of both mill bases were mixed to obtain a resin black matrix paste.

The thus-obtained resin black matrix paste was coated on a non-alkali glass substrate (thickness: 0.7 mm) by spin coating, and then dried by heating in air by using an oven at 50° C. for 10 minutes, at 90° C. for 10 minutes, and 110° C. for 20 minutes to obtain a polyimide precursor colored thin film having a thickness of 1.3 µm. A positive photoresist (produced by Tokyo Ohka Co., Ltd., OFPR-800) was coated on the thus-obtained thin film, and then dried by heating at 80° C. for 20 minutes to obtain a resist film having a thickness of 1 µm. The photoresist film was irradiated with ultraviolet rays at a wavelength of 365 nm with a strength of 50 mJ/cm$^2$ through a chromium mask by using Canon Corp., Ultraviolet Exposure Machine PLA-501. After exposure, the substrate was dipped in a developing solution comprising a 2.38 wt % tetramethylammonium hydroxide aqueous solution to simultaneously etch the photoresist and the polyimide precursor colored thin film. After etching, the unnecessary photoresist layer was separated by using methyl cellosolve acetate. The thus-obtained polyimide precursor colored thin film was further heat-treated at 300° C. for 30 minutes in a nitrogen atmosphere to obtain a resin black matrix pattern having a thickness of 1.0 µm.

G-2. Formation of Colored Thin Film

The red paste (RC-1) used in Example 10 was coated on the resin black matrix by spin coating, and then dried by heating in air by using an oven at 50° C. for 10 minutes, 90° C. for 10 minutes, and 110° C. for 20 minutes to obtain a polyimide precursor colored thin film having a thickness of 1.6 µm. A positive photoresist (produced by Tokyo Ohka Co., Ltd., OFPR-800) was coated on the thus-obtained thin film, and then dried by heating at 80° C. for 20 minutes to obtain a resist film having a thickness of 1.1 µm. The photoresist film was irradiated with ultraviolet rays at a wavelength of 365 nm with a strength of 50 mJ/cm$^2$ through a chromium mask by using Canon Corp., Ultraviolet Exposure Machine PLA-501. After exposure, the substrate was dipped in a developing solution comprising a 2.38 wt % tetramethylammonium hydroxide aqueous solution to simultaneously etch the photoresist and the polyimide precursor colored thin film. After etching, the unnecessary photoresist layer was separated by using methyl cellosolve acetate. The thus-obtained polyimide precursor colored thin film was further heat-treated at 300° C. for 30 minutes in a nitrogen atmosphere to obtain a resin red colored thin film pattern having a thickness of 1.6 μm. Similarly, green and blue colored thin film patterns each having a thickness of 1.6 μm were formed by using the green paste (GC-1) used in Example 5, and the blue paste (BC-1) used in Example 1, respectively, to obtain a color filter comprising pixels of the three primary colors, i.e., red, green and blue.

G-3. Formation of Overcoat Layer 65.05 g of trimellitic acid was dissolved in 280 g of γ-butyrolactone, and 74.95 g of γ-aminoproppyltriethoxysilane was added to the resulting solution, followed by heating at 120° C. for 2 hours. 7 g of bisphenoxyethanolfluorene diglycidyl ether and 15 g of diethyleneglycol dimethyl ether were added to 20 g of the resultant solution, and the resulting mixture was stirred at room temperature (about 23° C.) for 2 hours to obtain a thermosetting resin solution composition (PA-7).

The thus-obtained thermosetting resin solution composition (PA-7) was coated on the color filter by spin coating, and then heated at 100° C. for 5 minutes and 260° C. for 30 minutes to form an overcoat having a thickness of 1.0

G-4. Formation of Transparent Electrode Layer

Then, ITO was deposited on the overcoat by sputtering to form ITO having a thickness of 1400 angstroms and surface resistance of 15 Ω/□.

G-5. Production of Liquid Crystal Display

The color filter comprising the ITO formed thereon was washed with a neutral detergent, and an alignment film composed of a polyimide resin was coated by a printing method, and heated by a hot plate at 250° C. for 10 minutes. The alignment film had a thickness of 0.07 μm. The color filter substrate was subjected to lapping, and a sealing agent was coated thereon by a dispensing method, and then heated by a hot plate at 90° C. for 10 minutes.

On the other hand, a glass substrate having a TFT array formed thereon was washed in the same manner as the above, and an alignment film was coated thereon, and then heated. Then, spherical spacers having a diameter of 5.5 μm were dispersed on the substrate, and the substrate was combined with the color filter substrate, followed by heating at 160° C. for 90 minutes to harden the sealing agent. After the thus-formed cell was allowed to stand at 120° C. and 13.3 Pa for 4 hours and then in nitrogen for 0.5 hour, a liquid crystal was injected into the cell under vacuum. In injecting the liquid crystal, the cell was placed in a chamber, and the chamber was evacuated to 13.8 Pa at room temperature. Then, the liquid crystal injection hole of the cell was immersed in the liquid crystal, and the chamber was returned to atmospheric pressure with nitrogen. After the injection of the liquid crystal, the -liquid crystal injection hole of the cell was sealed with an ultraviolet curable resin. Then, polarizers were bonded to the outsides of the two glass substrates of the cell to complete the cell. The thus-obtained cell was modularized to complete a liquid crystal display.

As a result of observation of the obtained liquid crystal display, the liquid crystal display exhibited a viewing angle transverse deviation of 30 with contrast of 10, low viewing angle characteristic, no coloring in an on state (black display), and good display performance.

EXAMPLE 17

The same procedure as Example 16 was repeated except that the color pastes (BC-3, GC-3, RC-3) were used to form a color filter, and complete a liquid crystal display.

A s a result of observation of the obtained liquid crystal display, the liquid crystal display exhibited a viewing angle transverse deviation of 1° with contrast of 10, low viewing angle characteristic, no coloring in an on state (black display), and good display performance.

EXAMPLE 18

The same procedure as Example 16 was repeated except that the color pastes (BC-5, GC-5, RC-5) were used to form a color filter, and complete a liquid crystal display.

As a result of observation of the obtained liquid crystal display, the liquid crystal display exhibited a viewing angle transverse deviation of 3° with contrast of 10, low viewing angle characteristic, no coloring in an on state (black display), and good display performance.

EXAMPLE 19

In forming a color filter by the same method as Example 16, each of the colored thin films had a thickness of 2.4 μm, and a fixed spacer was formed on a resin black matrix at the same time as each of the colored thin films. The spacer formed had a structure in which colored thin films of red, green and blue were laminated.

A liquid crystal display was produced according to the same procedure as Example 16 except that the thus-obtained color filter was used without dispersion of spacers. As a result, the liquid crystal display exhibited a viewing angle transverse deviation of 4° with contrast of 10, low viewing angle characteristic, no coloring in an on state (black display), and good display performance.

COMPARATIVE EXAMPLE 7

The same procedure as Example 16 was repeated except that the color pastes (BC-4, GC-4, RC-4) were used to form a color filter, and complete a liquid crystal display.

As a result of observation of the obtained liquid crystal display, the liquid crystal display exhibited a viewing angle transverse deviation of 24° with contrast of 10, high viewing angle characteristic, green coloring in an on state (black display), and poor display performance.

COMPARATIVE EXAMPLE 8

The same procedure as Example 16 was repeated except that the color pastes (BC-6, GC-7, RC-8) were used to form a color filter, and complete a liquid crystal display.

As a result of observation of the obtained liquid crystal display, the liquid crystal display exhibited a viewing angle transverse deviation of 15° with contrast of 10, high viewing angle characteristic, green coloring in an on state (black display), and poor display performance.

TABLE 1

| Example No. | Paste No. | Dispersion | Monomer component*) wt % | Particles for reducing birefringence in total solid content | Polymer composition (wt %) | Thickness (m) | Refractive index nTE | nTM | n(aveg) | Δn | Retardation Δnd (nm) | Contrast |
|---|---|---|---|---|---|---|---|---|---|---|---|---|
| Example 1 | BC-1 | BP-1 | FDA: 5.92% | No | PA-3/PA-1 85/15 | 1.50 | 1.7510 | 1.7410 | 1.7477 | 0.0100 | 15 | 1200 |
| Example 2 | BC-2 | BP-1 | FDA: 8.46% | No | PA-3/PA-1 50/50 | 1.50 | 1.7428 | 1.7405 | 1.7420 | 0.0023 | 3 | 1500 |
| Example 3 | BC-3 | BP-2 | FDA: 8.46% | PV23:15% | PA-3/PA-1 50/50 | 1.10 | 1.7415 | 1.7401 | 1.7410 | 0.0014 | 2 | 950 |
| Comp. Example 1 | BC-4 | BP-1 | No | No | PA-3 100 | 1.50 | 1.7620 | 1.7300 | 1.7513 | 0.0320 | 48 | 1100 |
| Example 4 | BC-5 | BP-3 | No | DP-1:11.9% | PA-3 100 | 1.20 | 1.8130 | 1.8032 | 1.8097 | 0.0098 | 12 | 940 |
| Com. Example 2 | BC-6 | BP-1 | No | No | PA-3 100 | 1.20 | 1.8200 | 1.7956 | 1.8118 | 0.0244 | 29 | 900 |
| Example 5 | GC-1 | GP-1 | No | PY138:13.5% | PA-4/PA-2 60/40 | 1.60 | 1.7980 | 1.7950 | 1.7970 | 0.0030 | 5 | 650 |
| Example 6 | GC-2 | GP-2 | FDA: 5.98% | PY138:15.5% | PA-4/PA-2/PA-1 16/64/20 | 1.55 | 1.7435 | 1.7431 | 1.7434 | 0.0004 | 1 | 700 |
| Example 7 | GC-3 | GP-3 | BPEFA: 9.45% | No | AP-1/BPEFA 70/30 | 1.55 | 1.6325 | 1.6327 | 1.6326 | −0.0002 | 0 | 920 |
| Comp. Example 3 | GC-4 | GP-4 | No | No | PA-4 100 | 1.20 | 1.8470 | 1.8100 | 1.8347 | 0.0310 | 44 | 610 |
| Example 8 | GC-5 | GP-5 | No | PY138(B): 13.5% | PA-4/PA-2 60/40 | 1.60 | 1.7980 | 1.7950 | 1.7970 | 0.0030 | 5 | 940 |
| Example 9 | GC-6 | GP-6 | No | DP-2:18.0% | PA-4/PA-2 60/40 | 1.60 | 1.7708 | 1.7688 | 1.7701 | 0.0020 | 3 | 700 |
| Comp. Example 4 | GC-7 | GP-7 | No | No | PA-4/PA-2 60/40 | 1.60 | 1.7553 | 1.7351 | 1.7486 | 0.0202 | 32 | 610 |
| Example 10 | RC-1 | RP-1 | FDA: 6.55% | No | PA-4/PA-5/PA-1 23/54/21 | 1.70 | 1.7998 | 1.7920 | 1.7972 | 0.0078 | 13 | 650 |
| Example 11 | RC-2 | RP-2 | FDA: 19.60% | PY138:6.1% | PA-4/PA-2/PA-1 10/40/50 | 1.60 | 1.7543 | 1.7520 | 1.7535 | 0.0020 | 4 | 780 |
| Example 12 | RC-3 | RP-3 | FDA: 3.27% | PR209: 12.6% | PA-4/PA-2/PA-1 18/72/10 | 1.60 | 1.7971 | 1.7977 | 1.7973 | −0.0006 | −1 | 630 |
| Comp Example 5 | RC-4 | RP-4 | No | No | PA-4/PA-2/S-1 42/35/22 | 1.70 | 1.7910 | 1.7000 | 1.7807 | 0.0310 | 53 | 700 |
| Example 13 | RC-5 | RP-5 | No | PY138:8.4% | PA-4/PA-5 10/90 | 1.60 | 1.8043 | 1.7951 | 1.8012 | 0.0092 | 15 | 580 |
| Example 14 | RC-6 | RP-6 | No | PY138(B): 8.4% | PA-4/PA-5 10/90 | 1.60 | 1.8046 | 1.7952 | 1.8015 | 0.0094 | 15 | 760 |
| Example 15 | RC-7 | RP-7 | No | DP-1:12.6% | PA-4/PA-5 10/90 | 1.60 | 1.7935 | 1.7834 | 1.7901 | 0.0101 | 16 | 620 |
| Comp. Example 6 | RC-8 | RP-8 | No | No | PA-4/PA-5 10/90 | 1.60 | 1.7923 | 1.7716 | 1.7854 | 0.0207 | 33 | 520 |

*) Containing a plane structural group

INDUSTRIAL APPLICABILITY

A color filter using a colored polymer thin film of the present invention exhibits reduced retardation, and can thus provide a liquid crystal display having excellent display performance.

What is claimed is:

1. A color filter comprising a colored polymer thin film used for pixels and having an average refractive index of 1.60 to 1.90, and an absolute value of birefringence of 0.01 or less.

2. A color filter according to claim 1, wherein the colored polymer thin film comprises a polymer having a plane structural group in side chains.

3. A color filter according to claim 2, wherein the plane structural group is a fluorene group.

4. A color filter according to claim 1, wherein the colored polymer thin film is colored with a pigment.

5. A color filter according to claim 1, wherein the colored polymer thin film contains particles for reducing birefringence.

6. A color filter according to claim 5, wherein the particles for reducing birefringence comprise a compound having a plane structural group.

7. A color filter according to claim 6, wherein the particles for reducing birefringence comprise a compound having a halogen group.

8. A color filter according to claim 7, wherein the particles for reducing birefringence comprise particles of any of Color Index Nos. PY138, PR209, PR242 and PV23.

9. A liquid crystal display comprising a color filter according to any one of claims 1 to 8.

10. A color filter according to claim 4, wherein the pigment comprises a yellow pigment comprising more than 50% by weight PY138 having a specific surface area between 40 $m^2/g$ and 120 $m^2/g$.

11. A color filter according to claim 4, wherein more than 50% by weight of the pigment has a specific surface area between 40 $m^2/g$ and 120 $m^2/g$.

* * * * *